Aug. 18, 1931.   R. L. GRUSS   1,819,414
SHOCK ABSORBING DEVICE
Filed Oct. 22, 1928
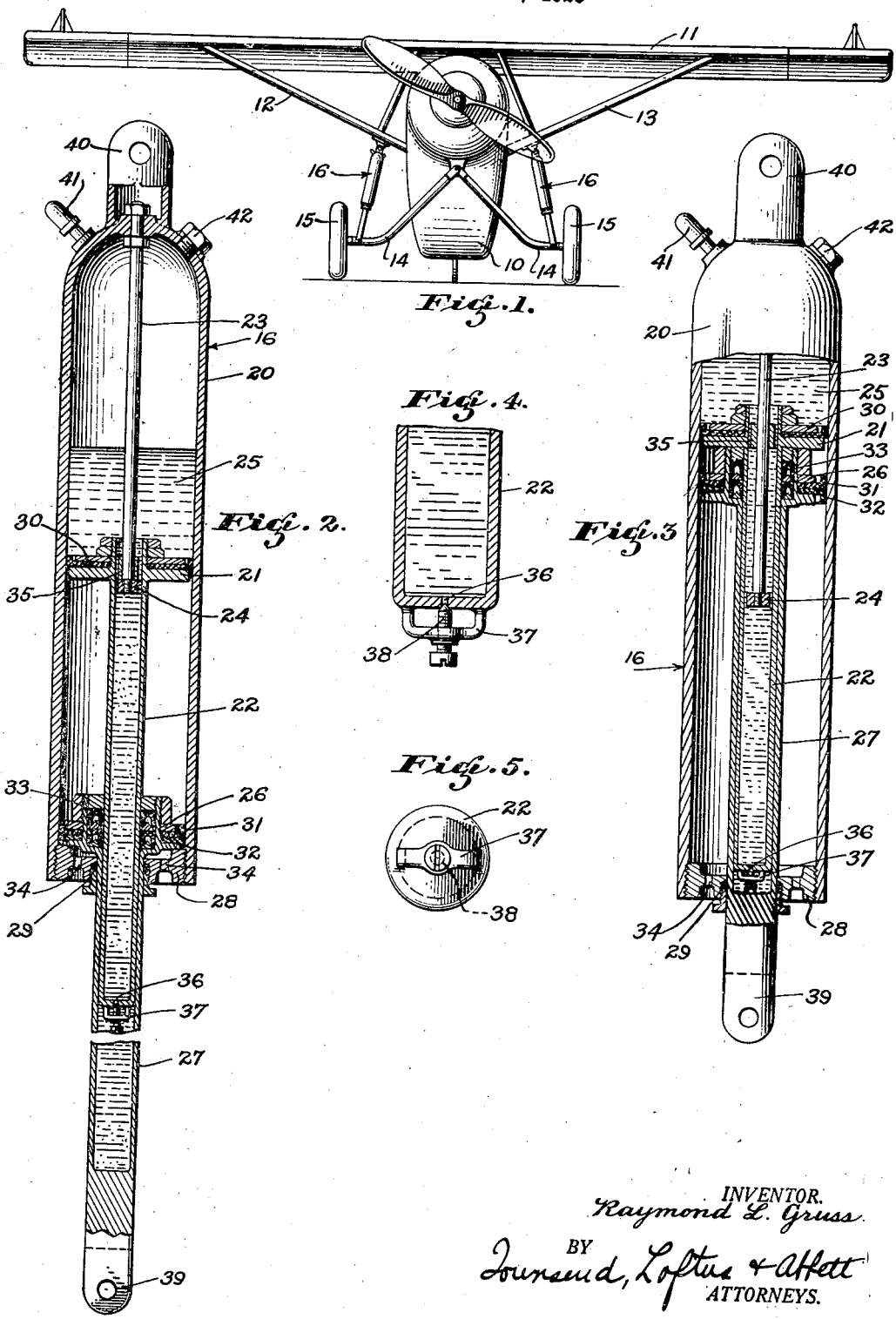
INVENTOR.
Raymond L. Gruss.
BY
Townsend, Loftus & Affett
ATTORNEYS.

Patented Aug. 18, 1931

1,819,414

UNITED STATES PATENT OFFICE

RAYMOND L. GRUSS, OF SAN FRANCISCO, CALIFORNIA; LAURA E. GRUSS ADMINISTRATRIX OF SAID RAYMOND L. GRUSS, DECEASED, ASSIGNOR, BY MESNE ASSIGNMENTS, TO CALIFORNIA BANK, OF LOS ANGELES, CALIFORNIA, A CORPORATION

SHOCK ABSORBING DEVICE

Application filed October 22, 1928. Serial No. 313,987.

My present invention relates to pneumatic shock absorbing devices and more particularly to an improved device of this character suitable for use in connection with the landing gear of aeroplanes.

In a co-pending application filed October 22, 1928, and bearing Serial No. 313,986 I have disclosed an improved shock absorbing strut for aeroplanes wherein I illustrate a certain embodiment of my invention.

It is therefore an object of my present invention to provide an improved device of the above character having a pneumatic air cushion and means for checking rebound in a manner different from that disclosed in my above referred to application.

For a better understanding of my invention, reference should be had to the accompanying drawings wherein I have shown by way of illustration and not of limitation, one manner of attaching my improved device and also the internal construction thereof.

In these drawings—

Figure 1 is a front view in elevation of an aeroplane equipped with my improved shock absorbing device, Figure 2 is a longitudinal sectional view of my device in its extended condition, Figure 3 is a view similar to that of Figure 2 showing the parts in their collapsed condition, Figure 4 is a fragmentary sectional view of a detail of my device, and Figure 5 is a view looking upward at the bottom of the portion shown in Figure 4.

In Figure 1, 10 designates the fuselage of an aeroplane having a wing structure 11 of the monoplane type. The wing structure 11 is supported upon the fuselage 10 by means of suitable struts 12 and 13 and connected to the fuselage at its central point I show a wheel axle 14 which is in two parts, each part being hinged at its inner end to the fuselage. Mounted upon the axles 14 are the usual landing wheels 15 and interposed between the axles 14 adjacent the wheels 15, I propose to mount my improve shock absorbing device or strut which I have designated by the numeral 16. The struts 16 are secured to the struts 12 at their upper ends with a hinged connection so that relative movement therebetween will be possible and at their point of attachment with the axle there is also a hinged connection.

With this arrangement it will be seen that when the wheels are in contact with the ground, the total weight of the plane will be carried upon the shock absorbing device 16 and that when the wheels leave the ground, the device 16 will, under the influence of the air pressure therein, extend itself so that the wheels will assume a position further removed from the plane than here shown. This will permit the wheels to establish contact with the ground in landing before the weight of the plane is assumed thereby and, as a result, the weight of the plane will be slowly taken up by the air cushion as will hereinafter appear and thus the first shock and impact of landing will be absorbed by the full length of the air cushion, the pressure within the pneumatic cylinder starting at a low value and gradually increasing as the strut is compressed, thereby checking the downward motion of the plane in direct proportion to the force at which a landing is made.

The further aspect of my invention with respect to the rebound preventing characteristics thereof will best be understood in connection with a description of the remaining figures of the drawings.

In these figures of the drawings it will be seen that the shock absorbing device or strut 16 is comprised of an inverted pneumatic cylinder 20 having a piston head 21 adapted to operate therein when pressure is brought to bear thereupon by reason of external forces. The piston head 21 is shown as provided with a hollow piston rod 22 and extending from the top of the cylinder 20 centrally thereof I show a rod 23 which carries an enlarged head or stop 24. The interior of the hollow piston rod 22 communicates through the piston head 21 with the interior of the cylinder 20 so that when oil which I have designated in the drawings by the numeral 25 is placed within the cylinder 20 it will flow downwardly through the piston rod 22, as will hereinafter appear. Located within the cylinder 20 and below the piston head 21 I provide a second piston head 26. The piston head 26 is also provided with a hollow piston rod 27 which has an internal diameter corresponding substantially to the external diameter of the piston rod 22. The piston rod 27 is adapted to telescope over the piston rod 22 so that the two piston rods may move with respect to each other. At the lower end of the cylinder 20 I provide a suitable cylinder head 28 which is screw-threaded into the end of the cylinder 20. The cylinder head 28 carries a suitable packing 29 for preventing the escape of oil from my device at this point. The piston head 21 is also shown as provided with a packing gasket 30 which extends upwardly at its edges so as to withstand the pressures exerted from above and the piston head 26 is shown as provided with two packing gaskets 31 and 32 which are rolled at their edges so as to project respectively upwardly and downwardly. This arrangement of gaskets is to insure against the passage of air or oil in either direction about this piston head. At the interior of the piston head 26 where the piston rod 22 projects therethrough there is also provided a further packing 33 which is adapted to prevent the escape of oil from the interior of the cylinder rods and the cylinder 20. In order to prevent a pressure or vacuum existing within the cylinder 20 below the piston head 26, I provide openings or vents 34.

Referring now specifically to the interior construction of the hollow piston rods 22 and 27, it will be seen that the piston rod 22 is provided at a point adjacent the head 21 with a bearing 35 which slides upon the rod 23. This bearing is mounted centrally of the interior opening of the rod 22 by means of suitable webs so that a passage of oil may be maintained therearound. The function of this bearing is to guide the rod 23 and act in conjunction with the enlarged head 24 to prevent the piston head 21 from moving below the point where the bearing 35 and the head 24 engage. At the lower end of the piston rod 22 I provide an opening 36 through which oil may pass into the interior of the hollow piston rod 27. Adjacent the opening 36 mounted upon a suitable support 37 is a screw 38 which is adapted to be set for the purpose of controlling the flow of oil through the opening 36. The lower end of the hollow piston rod 27 is provided with a pair of ears 39 by means of which this end of my improved strut may be attached to the wheel axle and at the upper end of my devise there is also provided a pair of similar ears 40 for the purpose of attaching my device to the aeroplane fuselage or frame. At this end of the cylinder 20 I also show a suitable pneumatic valve 41 through which air under pressure may be introduced into the cylinder and adjacent thereto is a removable plug 42 in an opening through which the oil 25 may be introduced.

The operation of this embodiment of my improved shock absorbing strut in connection with an aeroplane is as follows: It is to be assumed that the cylinder 20 has been pumped up with air to a suitable pressure and that the plane to which it is attached is in the air and about to make a landing. Under these conditions the parts of my improved device are assumed to be in the positions in which they are illustrated in Figure 2 of the drawings. From this figure of the drawings it will be seen that the piston head 21 is in its lowermost position within the cylinder 20 with its hollow piston rod 22 projecting below the lower end of the cylinder 20. It will also be seen that the cylinder head 26 has also assumed its lowermost position so that its cooperating piston rod 27 will be extended to its outermost position. The piston head 21 will be held in the position here shown by reason of the pressure exerted thereupon by the air within the cylinder 20 and the position of the piston head 26 as shown will be maintained by reason of pressure exerted from within the cylinder 20 through the column of oil which extends into the hollow piston rods 22 and 27. A further force tending to move the piston head 26 and its attached piston rod 27 downwardly will, of course, be exerted by the weight of the wheels 15 and their axles 14. With the parts of my device in the position shown and under the conditions assumed, when the wheels 15 of the aeroplane contact with the ground as in landing, the first impact caused thereby will be taken up by the full length of deflection of the air within the cylinder 20. The deflection in this case will be determined by the force of the impact and the pressure of the air maintained within the cylinder 20. After the wheels have established contact with the ground, the air cushion will gradually pick up the weight of the machine and at the same time the hollow piston rod 27 and its piston head 26 will slowly move upwardly over the piston rod 22. The rate of this movement of the piston rod 27 will be determined by the rate of fluid flow through the opening 36. This latter movement will permit the plane to settle slowly to its ultimate level, while at the same time it maintains the full effect of the pneumatic cushion effective. Should the wheels leave the ground during this interval either due to sudden impact or uneven ground, all tendencies to rebound will be eliminated as the wheels will be carried out of contact with the ground before the piston 27 can again extend itself. By this arrangement all rebound will be effectively controlled hydraulically without sacrificing to any degree the efficiency of the air cushion provided in the cylinder 20.

After the weight of the plane has been transferred to the wheels 15 as when the plane has assumed a relatively slow speed or has stopped, the parts of my improved device will assume the position substantially as shown in Figure 3. When the parts are in this position it will be seen that the piston head 21 has moved upwardly within the cylinder 20 a distance depending upon the amount of pressure carried within the cylinder. It will also be seen that the hollow piston rod 27 has telescoped over the piston rod 22 and that the oil therein has been displaced so that it now lies mostly above the piston head 21 and within the cylinder 20. This Figure of the drawing also illustrates the position of the parts during the taxiing period of the plane and from an inspection it will be seen that the entire weight of the plane will be supported upon the cushions of compressed air within the cylinders 20 and that, should the plane rise from the ground, the air pressure within the cylinder will extend the device in proportion to the weight removed from the wheels and, as a result, provide a cushion wherein the greatest amount of flexibility under that particular weight will be automatically produced, thus relieving the plane of all jar and rack when taxiing over rough ground. In taking off, as the plane tends to rise, the device will extend itself and thus allow the compressed air in the cylinder 20 to expand and thus permit the device to support a portion of the load of the plane until the wheels have finally left the ground. At this time the hollow pistons 22 and 27, by reason of the oil contained therein, will slowly extend themselves with respect to each other at a rate depending upon the flow of fluid therebetween through the opening 36 and, should it happen that the wheels again contact with the ground either before or after these piston rods have extended themselves, the air cushion within the cylinder 20 will be immediately brought into play without necessitating a loss of altitude by the plane. It will be understood that the size of the opening 36 may be varied and that the screw 37 may also be adjusted to vary the flow of liquid therethrough as determined by the particular application and conditions under which the particular shock absorbing device is to be used.

I have found that my device makes it possible to effect a much more rapid take-off and shorter landings than is generally possible with the ordinary type of landing gear. These characteristics I attribute particularly to the fact that the air cushion comes into play immediately when the wheels touch the ground and gradually assumes the weight of the machine, while at the same time the hydraulic features as described in connection with the hollow piston rods 22 and 27 permit the machine to settle with the wheels always in contact with the ground during this period and also reduce the possibilities of rebound.

From the above it will be seen that I have produced a new and improved type of shock absorbing device for aeroplanes and the like, and, while I have shown in the accompanying drawings a preferred embodiment thereof, I desire to have it understood that many modifications thereof will readily suggest themselves to those skilled in the art to which my invention appertains without departing from the spirit and scope of the invention as defined in the appended claims.

Having thus described my invention, what I claim and desire to secure by Letters Patent is—

1. In combination with a shock absorbing air spring for aeroplane landing gear comprising a pneumatic cylinder and a piston head operating therein, a hollow piston rod carried by said piston head, a second piston head in said cylinder and surrounding said hollow piston rod, and a second hollow piston rod for said second piston head telescoping over said first piston rod, said hollow piston rods being adapted to contain liquid and cooperate with each other to prevent rebound when said shock absorbing spring is compressed due to impact with the ground in landing.

2. A shock absorbing device for aeroplane landing gear comprising a cylinder adapted to contain air under pressure, a piston adapted to operate within said cylinder and compress said air when pressure is exerted thereupon, a hollow piston rod having its interior communicating with said cylinder, a plunger member secured to the end of said cylinder and projecting into said hollow piston rod, a second piston located in said cylinder below said first piston, and a second hollow piston rod telescoping over said first hollow piston rod and cooperating with said first piston rod to check rebound, the interior of said first and second hollow piston rods being in communication with the pressure chamber of said cylinder and adapted to contain a liquid.

3. In a shock absorbing device of the pneumatic cylinder type, the combination of a cylinder adapted to contain air under pressure, a piston operating within said cylinder, a hollow piston rod secured to said cylinder, a stop for limiting the outward movement of said piston to a point intermediate the ends of said cylinder, a second piston operating within said cylinder below said first piston, a second hollow piston rod telescoping over said first piston rod, said first hollow piston rod being in communication with the pressure chamber of said cylinder and adapted to contain oil, and a by-pass between said first and second hollow piston rods whereby said oil may flow in a restricted manner between said hollow piston rods to thereby check rebound when said shock absorbing device is compressed due to impact with the ground in landing.

4. In a shock absorbing device of the pneumatic cylinder type, the combination of a cylinder adapted to contain air under pressure, a piston operating within said cylinder, a hollow piston rod secured to said cylinder, a stop for limiting the outward movement of said piston to a point intermediate the ends of said cylinder, a second piston operating within said cylinder below said first piston, a second hollow piston rod telescoping over said first piston rod, said first hollow piston rod being in communication with the pressure chamber of said cylinder and adapted to contain oil, and a communicating passageway between said first and second hollow piston rods whereby oil may flow therebetween to permit the pressure within said cylinder to be applied through said oil to extend said hollow piston rods when the load is removed therefrom.

RAYMOND L. GRUSS.